Dec. 15, 1931. J. C. BLAIR 1,836,358
METHOD AND APPARATUS FOR DRAWING SHEET GLASS
Filed Dec. 26, 1923 2 Sheets-Sheet 1

INVENTOR
James C. Blair
BY C H Rowley
ATTORNEY

Patented Dec. 15, 1931

1,836,358

UNITED STATES PATENT OFFICE

JAMES C. BLAIR, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR DRAWING SHEET GLASS

Application filed December 26, 1923. Serial No. 682,611.

This invention relates to improvements in the art of drawing sheet glass, and more particularly to the art of drawing the sheet, in continuous form, downwardly from the molten source.

One of the objects of the invention is to increase the productive capacity of the continuous tank furnace which furnishes the molten glass from which the sheet is drawn. In other words, by employing the principles of this invention a much greater daily production of sheet glass can be obtained from a given size of furnace.

Another object is to provide an improved method and apparatus for producing the glass sheet by flowing the molten glass into the hollow upper end of a vertically positioned slab, and directing this molten glass in equal quantities over and down the opposite converging sides of the slab, from the lower end of which the combined streams of glass are drawn away in single sheet form.

In the most successful forms of sheet glass drawing apparatus heretofore used, the glass producing materials are melted in one end of a rather long tank furnace, the molten glass flowing through the settling and refining portions of the tank to the opposite end where the surface glass flows into a shallow receptacle from which the sheet is drawn. Experience has shown that in installations of this type, although the main tank portions may hold a body of glass having a depth of several feet, only the upper stratum to a depth of a very few inches flows freely through the tank, and most of the lower strata of the molten glass are practically stagnant. Now it is essential that the molten glass remain a certain length of time in the tank to reach the proper stage of refinement before it may be successfully drawn into sheet form, and the surface area of this type of tank must bear such a relation to the amount of glass drawn from the tank that the surface glass will remain in the tank for the proper refining period. For example, if one attempted to draw two sheets from a furnace designed to feed a single sheet, the drain on the tank would be such that the surface stratum of glass would flow too rapidly through the furnace and would not have time to reach the properly refined condition. It has been considered necessary in such cases to greatly increase the surface area of the tank so that the rate of flow for the increased output would still allow all of the surface glass to remain in the tank the necessary length of time.

According to this invention, similar results are accomplished economically by increasing the depth of flow of the molten glass through the tank. For example, if the flowing stream of glass were made twice as deep as before, the size or the drawing rate of the sheet could be substantially doubled without increasing the rate of flow through the furnace over that in present installations. This end is reached by drawing the sheet from the lower strata of glass in the tank, thus necessitating a flow of the lower, and now inactive portions of the molten pool.

In the improved drawing method here disclosed, molten glass from the lower strata in the tank is flowed into the hollow upper end of a vertically positioned slab, wherein means are provided to insure an equal flow of glass up over and down the sides of the slab. The sheet is drawn from the converging streams at the lower edge of the slab.

A sheet flowed or drawn downwardly may be formed much more rapidly than one drawn upwardly, since in the first case the force of gravity assists rather than retards the operation. By withdrawing the molten glass from the bottom of the tank, the formerly stagnant lower strata are kept in motion and a greatly increased depth of stream flow is provided whereby the glass may be flowed from the tank rapidly and in increased quantity, without putting too great a drain on the tank. The down-draw form of apparatus here disclosed is well adapted to receive this rapid flow of glass and convert same into sheet glass. The combined result is to produce a much greater quantity of sheet glass in a given time with a tank of relatively small capacity.

The above, and other objects and advantages of this invention will be better understood from the following detailed description of certain forms of apparatus embodying the principles of this invention.

Figure 1:
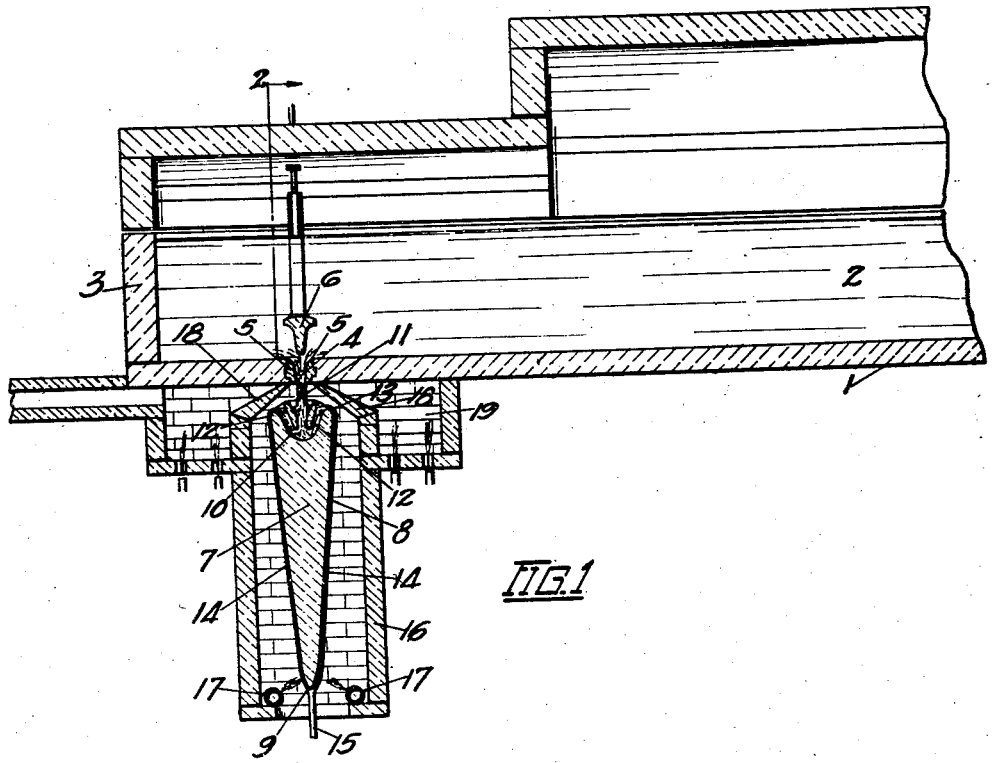
Fig. 1 is a longitudinal section through the refining end of the supply tank, and a transverse vertical section through the sheet forming mechanism.
Figure 2:
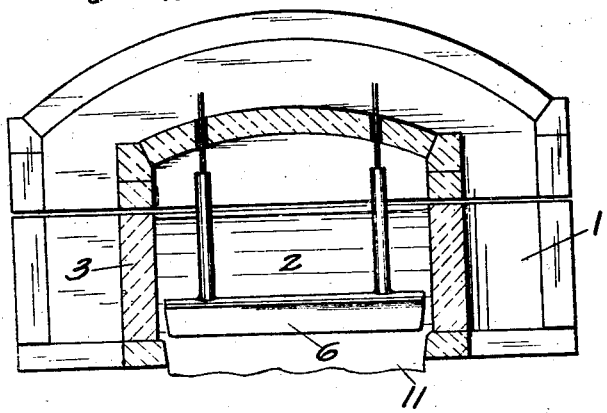
Fig. 2 is a vertical section taken through the refining tank of Fig. 1, and substantially upon the line 2—2 of Fig. 1.

Referring first to Figs. 1 and 2 of the drawings, 1 indicates the continuous tank furnace, the molten glass 2 being first produced in the melting end of the furnace, not here shown but being at the right of Fig. 1, this glass then flowing slowly through the furnace to the refining end 3. Adjacent the refining end of the tank an elongated slot or opening 4 is provided in the bottom wall of the tank, the walls of this slot preferably being lined with removable refractory members 5. A gate or plug member 6 is suspended within the molten glass above the slot 4, and this gate may be raised or lowered by any suitable means to regulate the flow of molten glass from the tank downwardly through the slot.

Suitably supported beneath the opening 4 is a vertically positioned slab or forming member 7. This slab is substantially wedge-shaped, having opposite flat downwardly converging faces 8 which meet at the lower edge 9 of the slab. A recess or receptacle 10 is formed in the top of the slab, and this recess first receives the stream of molten glass 11 which flows downwardly through slot 4. Within the recess 10 is positioned a pair of longitudinally extending partitions or baffle plates 12. The downwardly flowing stream of molten glass 11 is first caught between these partitions 12 and directed or guided to the bottom of the glass receiving recess 10. The molten glass then flows up at the sides of the recess, outside of the partitions 12, and overflows in thin streams over the upper side edges 13 of the slab and thence down the opposite converging flat faces 8. Adjusting means, not here shown, are provided in connection with the supporting means for slab 7, so that the height and inclination of this slab may be varied as desired to assure even and equal flows of molten glass over the two upper edges 13 of the slab. The partitions or baffles 12 force the centrally flowing stream of molten glass to pass first to the bottom of recess 10, where it is divided into two equal upwardly flowing streams of glass, which in turn are directed between the respective partitions and the sides of the slab to the upper edges 13. This forced division of the glass stream greatly assists in securing an even and equal flow of glass down the two faces of the slab. The two streams of molten glass 14, flowing down the slab faces 8, flow together at the lower edge 9 of the slab, and from these combined streams of molten glass the glass sheet 15 is drawn downwardly.

Any suitable means for drawing and guiding the glass sheet 15 downwardly, and for supporting and carrying away the formed sheet, may be used. Many forms of apparatus for this purpose have already been disclosed in the prior art.

The forming slat 7 is substantially enclosed by the protecting chamber 16, and the interior of this chamber will be heated in any suitable manner, for example, by burners such as shown at 17, to keep the slab and the streams of molten glass 14 at the proper temperature prior to the sheet-forming operation. Preferably, the upper portions 18 of the side walls of chamber 16 will be sloped inwardly toward the respective sides of slot or opening 4. This is to allow a second furnace chamber 19, which substantially surrounds the opening 4 beneath the furnace, to direct its heat beneath as much as possible of the lower stratum of glass within the furnace adjacent opening 4. The molten glass within a furnace adjacent the bottom and side walls will ordinarily be considerably chilled by radiation and conduction through and from these walls, and it is desirable that the bottom walls of the furnace and the molten glass directly adjacent the opening 4 be heated to keep the glass at a sufficiently high temperature to flow freely through the opening. This is the purpose of heating chamber 19 which may be heated in any suitable manner as by the burners 20 here shown.

Figure 3:
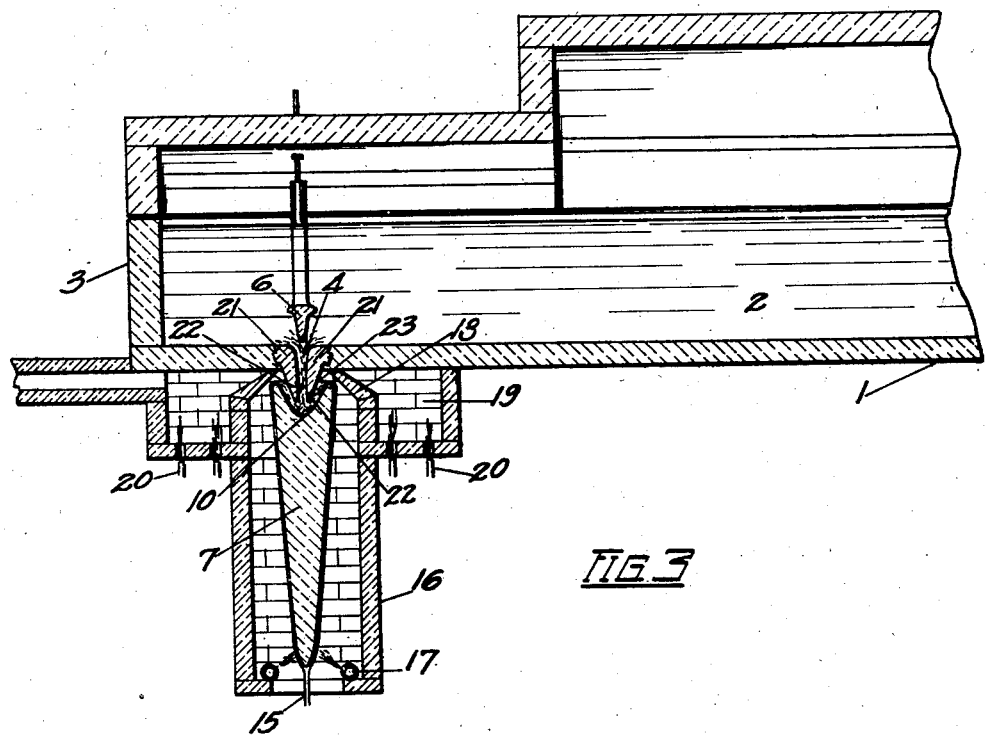
Fig. 3 is a view similar to Fig. 1, showing a slightly modified form of the sheet-forming mechanism.

In Fig. 3 a slightly modified form of apparatus is disclosed. In this construction the refractory plates 21 which outline the side walls of slot 4 are considerably larger than the plates 4 shown in Fig. 1, and comprise downwardly extending flange members 22 which project into the recess 10 in slab 7 and take the place of the partitions 12 previously disclosed. The stream of molten glass 23 flows downwardly between plates 21 to the bottom of recess 10 where it divides and flows up over and down the sides of slab 7 as in the form of apparatus already described. Otherwise, the construction and operation of this modification is similar to that shown in Figs. 1 and 2.

Figure 4:
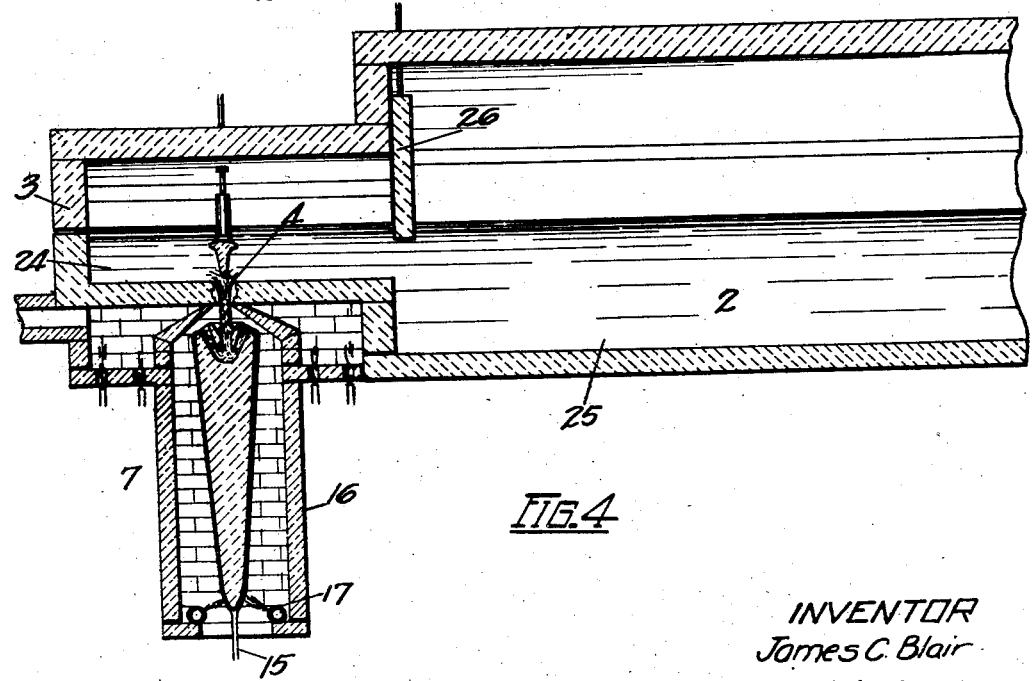
Fig. 4 is a view similar to Fig. 1, showing how the flow of molten glass to the delivery orifice may be restricted to intermediate strata in the tank.

The sheet-forming mechanism disclosed in Fig. 4 is the same as that shown in Fig. 1, but the furnace is so designed as to cut off the extreme lower strata, and if desired some of the upper strata, of the molten glass, and confine the glass fed to the opening 4 to the intermediate strata. The refining end 24 of the trank, is made somewhat shallower than the main tank portion 25 so as to cut off the extreme lower strata of glass, which may not be properly conditioned for making good sheet glass. Also, an adjustable gate or shear-cake 26 is provided at the entrance to the refining end of the tank to hold back or impede the flow of such of the extreme upper strata of the flowing glass as might be undesirable. The flow of glass to the opening 4 would then be limited to a considerable depth of glass taken from the intermediate strata of glass in the tank.

Claims:

1. Apparatus for making sheet glass, comprising a tank furnace in which molten glass is produced, there being an elongated opening in the lower portion of the refining end of the tank, a slab therebeneath having a recess therein, the walls of the sides of the opening projecting downwardly into the recess, whereby molten glass flows through the opening and is guided to the bottom of the recess, thence up around the downwardly projecting walls and over and down the sides of the slab, and means for drawing away these converging flows in sheet form.

2. Sheet glass making apparatus comprising a vertically positioned slab having a single undivided recess in the top thereof and downwardly converging sides, a source of molten glass from which glass flows into the recess, and means within the recess for causing the molten glass to flow to the lower portion of the recess and thence up and over the side edges of the slab.

3. Sheet glass making apparatus comprising a vertically positioned slab having a single undivided recess in the top thereof and downwardly converging sides, a pair of baffle members within the recess, a source of molten glass from which glass flows down between the baffles and thence up around the baffles and over the side edges of the slab.

4. Sheet glass making apparatus comprising a vertically positioned slab having a single undivided recess in the top thereof and downwardly converging sides, a pair of baffle member within the recess, a source of molten glass from which glass flows down between the baffles and thence up around the baffles and over the side edges of the slab, and down the converging sides, and means for drawing away the converging flows in sheet form.

5. Sheet glass making apparatus comprising a vetrically positioned slab having a single undivided recess in the top thereof and downwardly converging sides, a source of molten glass from which glass flows into the recess, and means within the recess for dividing the downflowing stream into two equal upflowing streams which spill over the upper side edges of the slab.

6. The method of making sheet glass, which consists in producing a body of molten glass in a continuous tank furnace, flowing the molten body of glass to the refining end of the tank without decreasing the depth thereof, and flowing glass in sheet form downwardly from the lower strata of this refined glass within the refining end of the tank.

7. The method of making sheet glass, which consists in producing a body of molten glass in a continuous tank furnace, flowing the molten body of glass to the refining end of the tank without decreasing the depth thereof, flowing glass downwardly from the lower portion of the refined glass within the refining end of the tank onto a slab positioned therebeneath, and then drawing this glass away in sheet form.

8. The method of making sheet glass, which consists in flowing molten glass downwardly from a molten bath into the top of a receptacle at a point intermediate its side edges to form a single pool, directing the molten glass within the pool in equal quantities upwardly and over the said side edges of said receptacle, then flowing the glass downwardly over converging stationary surfaces and drawing away the converging flows in sheet form.

9. The method of making sheet glass, which consists in flowing molten glass downwardly from a molten bath into a receptacle to form a single pool, directing the molten glass within the pool by mechanical means immersed therein in equal quantities upwardly and over the edges of said receptacle, and in forming the overflow glass into a sheet.

10. The method of making sheet glass, which consists in flowing molten glass downwardly from a molten bath into a receptacle to form a single undivided pool, in immersing within said pool mechanical means to divide the flow of glass at the bottom of said pool into two equal upflows which spill over the edges of the receptacle, in directing the overflow glass downwardly over converging stationary surfaces, and in drawing away the converging flows in single sheet form.

11. The method of making sheet glass, which consists in flowing molten glass downwardly from a molten bath into a receptacle to form a single pool, in separating the glass forming said pool into a central downwardly moving portion and two outer upwardly moving portions, said upwardly moving portions overflowing the receptacle, and in uniting the overflow portions in the form of a single sheet.

Signed at Toledo, in the county of Lucas, and State of Ohio, this 17th day of December, 1923.

JAMES C. BLAIR.